United States Patent
Ito et al.

(10) Patent No.: US 12,168,404 B2
(45) Date of Patent: Dec. 17, 2024

(54) SEAT ROTATING DEVICE

(71) Applicant: TOYOTA BOSHOKU KABUSHIKI KAISHA, Aichi-ken (JP)

(72) Inventors: Sadao Ito, Aichi-ken (JP); Naoya Okamoto, Aichi-ken (JP); Ryosuke Shioya, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 439 days.

(21) Appl. No.: 17/722,080

(22) Filed: Apr. 15, 2022

(65) Prior Publication Data
US 2022/0332223 A1 Oct. 20, 2022

(30) Foreign Application Priority Data
Apr. 16, 2021 (JP) ................................. 2021-069493

(51) Int. Cl.
*B60N 2/14* (2006.01)
*B60N 2/06* (2006.01)

(52) U.S. Cl.
CPC ...... *B60N 2/14* (2013.01); *B60N 2/06* (2013.01)

(58) Field of Classification Search
CPC ........ B60N 2/06; B60N 2/14; B60N 2002/022
USPC ................ 296/65.06, 65.07, 65.13, 65.18
See application file for complete search history.

(56) References Cited

U.S. PATENT DOCUMENTS

| 8,079,641 B2* | 12/2011 | Lung | B60N 2/06 297/344.26 |
| 8,205,945 B2* | 6/2012 | Ma | B60N 2/14 297/344.26 |
| 2007/0284905 A1* | 12/2007 | Bailey | B60N 2/14 296/65.07 |
| 2010/0052392 A1* | 3/2010 | Lung | B60N 2/14 296/65.13 |

FOREIGN PATENT DOCUMENTS

| DE | 102004013628 A1 * | 10/2005 | ............... B60N 2/14 |
| DE | 102021128078 A1 * | 5/2022 | ........... B60N 2/0715 |
| JP | S62-076036 U | 5/1987 | |
| JP | 2004-042781 A | 2/2004 | |
| JP | 2006-76482 A | 3/2006 | |

OTHER PUBLICATIONS

Japanese Office Action in counterpart Japanese Application No. 2021-069493, dated Apr. 2, 2024.

\* cited by examiner

*Primary Examiner* — Jason S Daniels
(74) *Attorney, Agent, or Firm* — Greenblum & Bernstein, P.L.C.

(57) ABSTRACT

A seat rotating device includes a base plate, a rotating plate, a coupling unit, and a drive unit. The coupling unit includes a link, a guide having a linearly extending shape, and a moving body that is movable along the guide and supports the rotating plate. The drive unit can move the moving body along the guide. The link includes a fixing end and a rotating end. The guide has a shape extending linearly along a diameter of a virtual circle, the virtual circle having length twice the distance between the fixing end and the rotating end as its radius, and having the fixing end as its center. The moving body moves the rotating plate along the guide while relatively rotating the rotating plate with respect to the moving body.

8 Claims, 14 Drawing Sheets

SEAT ROTATING DEVICE

The present application claims priority based on Japanese Patent Application No. 2021-069493 filed on Apr. 16, 2021 with the Japanese Patent Office, the entire contents of which are incorporated herein by reference.

BACKGROUND OF THE INVENTION

Field of the Invention

The present disclosure relates to a seat rotating device.

Description of the Background Art

Conventionally, a seat rotating device capable of rotating a seat body between a seating position and a getting-on and -off position is known. For example, Japanese Patent Laying-Open No. 2006-76482 discloses a car seat rotating slide device including a linear rail and a curved rail that are fixed to a base material, a linear slider movable along the linear rail, a curved slider movable along the curved rail, a dentition forming member disposed between the linear rail and the curved rail, a support member supporting a seat body, a motor provided on the support member, and a pinion connected to the motor. The dentition forming member includes a first arc-shaped dentition and a second arc-shaped dentition that mesh with the pinion.

In the rotating slide device, as the pinion moves while meshing with each arc-shaped dentition of a dentition forming member by driving the motor, the linear slider moves along the linear rail and the curved slider moves along the curved rail. Thus, the support member and the seat body supported by the support member slide while rotating with respect to the base member.

SUMMARY OF THE INVENTION

In the rotating slide device described in Japanese Patent Laying-Open No. 2006-76482, an accurate track of the curved rail is required to be calculated, and precise processing is required for the curved rail and the curved slider in order to ensure smooth movement of the curved slider along the curved rail. In order that the pinion meshes smoothly with each arc-shaped dentition of the dentition forming member, particularly a shape of a transition portion between the first arc-shaped dentition and the second arc-shaped dentition is required to be accurately calculated and processed.

An object of the present disclosure is to provide a seat rotating device capable of omitting calculation of a precise locus and rotating a seat body with a relatively simple structure.

A seat rotating device according to one aspect of the disclosure is a seat rotating device capable of rotating a seat body between a seating position where the seat body faces a front of a car and a getting-on and -off position where the seat body faces an opening of a door of the car. The seat rotating device includes: a base plate fixed to a floor side; a rotating plate fixed to a lower surface of the seat body so as not to rotate relative to the seat body; a coupling unit that couples the base plate and the rotating plate such that the rotating plate is rotatable with respect to the base plate between the seating position and the getting-on and -off position; and a drive unit that drives the coupling unit. The coupling unit includes: a link that couples the base plate and the rotating plate; a guide that is provided on the base plate and has a linearly extending shape; and a moving body that is movable along the guide and supports the rotating plate such that the rotating plate is relatively rotatable with respect to the moving body, the drive unit is able to move the moving body along the guide, the link includes: a fixing end fixed to the base plate so as to be relatively rotatable with respect to the base plate; and a rotating end that is rotatable with respect to the base plate about the fixing end as a rotation center and is fixed to the rotating plate so as to be relatively rotatable with respect to the rotating plate, the guide has a shape extending linearly along a diameter of a virtual circle, the virtual circle having a length twice a distance between the fixing end and the rotating end as its radius, and having the fixing end as its center, and the moving body moves a part of the rotating plate along the guide, while relatively rotating the part with respect to the moving body in an identical direction to a direction in which the rotating plate rotates with respect to the rotating end when the rotating plate moves from the seating position to the getting-on and -off position, the part being spaced apart from a part of the rotating plate that is fixed to the rotating end.

According to this disclosure, the seat rotating device capable of omitting the calculation of the precise locus and rotating the seat body with the relatively simple structure can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
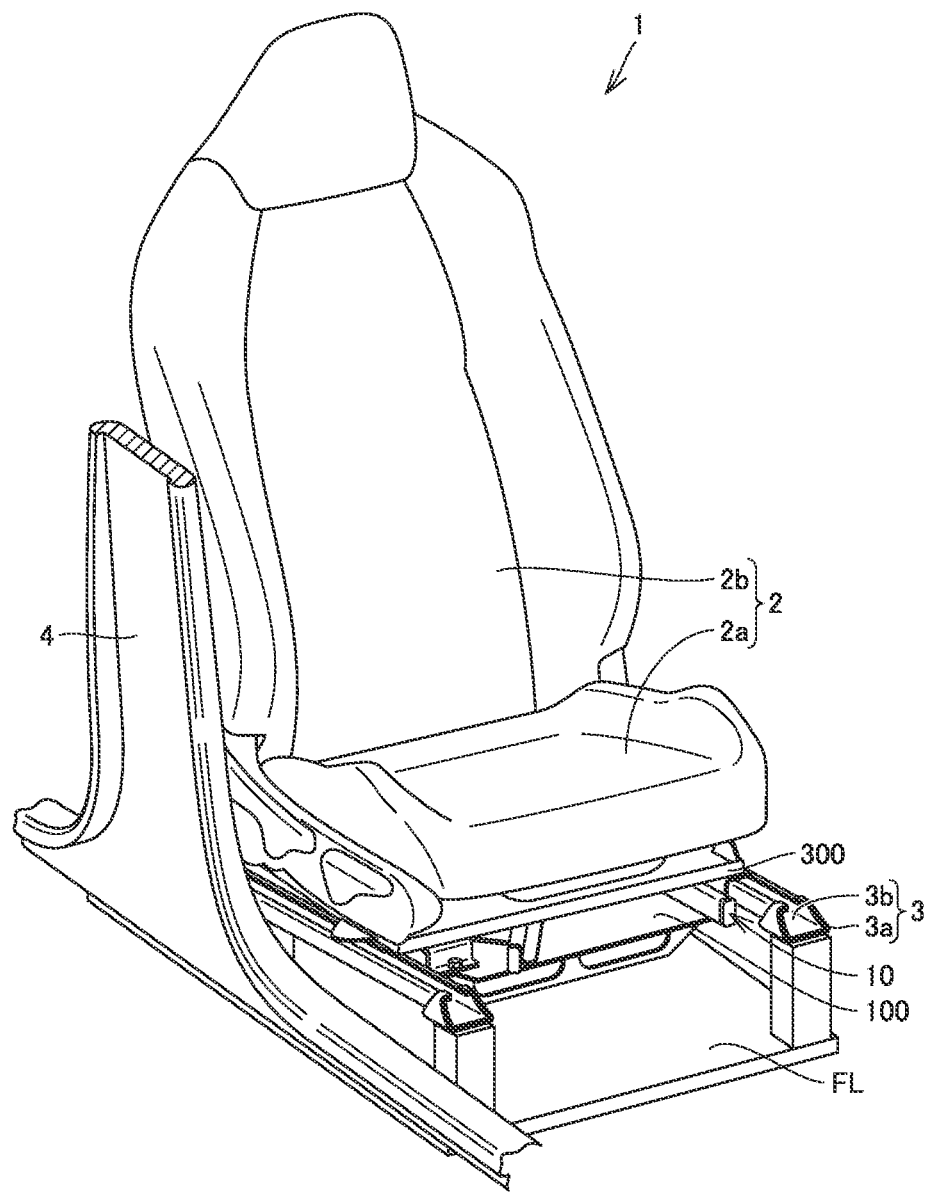
FIG. 1 is a perspective view illustrating a rotary seat in a seating position according to a first embodiment of the present disclosure.

With reference to the drawings, embodiments of the present disclosure will be described. In the drawings referred to below, the same or corresponding member is denoted by the same reference numeral.

First Embodiment

Figure 2:
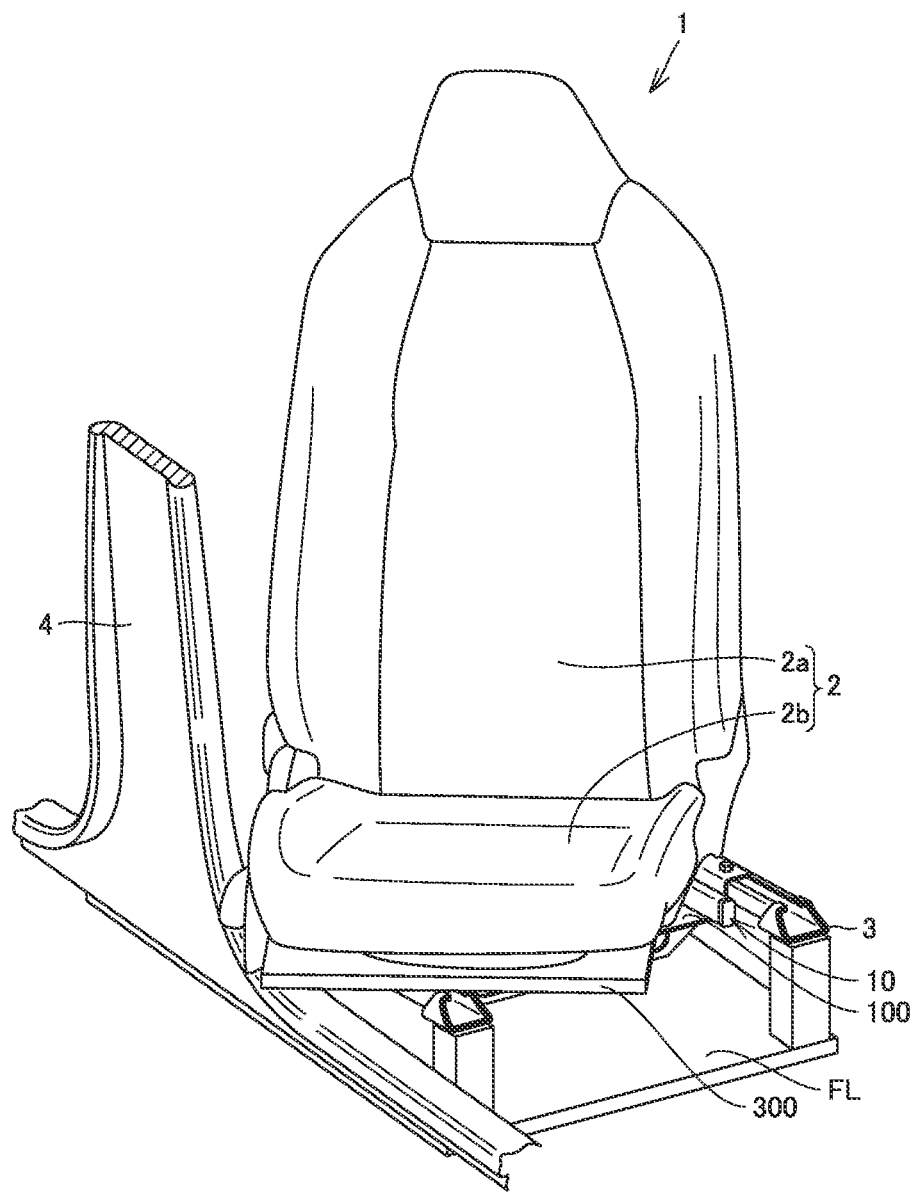
FIG. 2 is a perspective view illustrating the rotary seat at a getting-on and -off position.

FIG. 1 is a perspective view illustrating a rotary seat in a seating position according to a first embodiment of the present disclosure. FIG. 2 is a perspective view illustrating the rotary seat at a getting-on and -off position. A rotary seat 1 functions as a vehicle seat, particularly as a car seat.

As illustrated in FIGS. 1 and 2, rotary seat 1 of the first embodiment includes a seat body 2 and a seat rotating device 10.

Seat body 2 includes a seat cushion 2a and a seat back 2b. Seat cushion 2a constitutes a seat. Seat back 2b supports the back of the occupant seated on seat cushion 2a. Seat body 2 is disposed on a floor FL of the car.

A seat slider 3 that slides seat body 2 in a front-rear direction of the car with respect to floor FL is attached to floor FL. Seat slider 3 includes a lower rail 3a and an upper rail 3b.

Lower rail 3a is fixed to floor FL in a posture parallel to the front-rear direction of the car. Upper rail 3b is displaceable relative to lower rail 3a in the front-rear direction of the car (a longitudinal direction of lower rail 3a).

Seat rotating device 10 can rotate seat body 2 between the seating position (the position illustrated in FIG. 1) and the getting-on and -off position (the position illustrated in FIG. 2). The seating position is a position where seat body 2 faces a front of the car. The getting-on and -off position is a position where seat body 2 faces an opening of a door of the car. Seat rotating device 10 is fixed to a lower surface of seat body 2.

Figure 3:
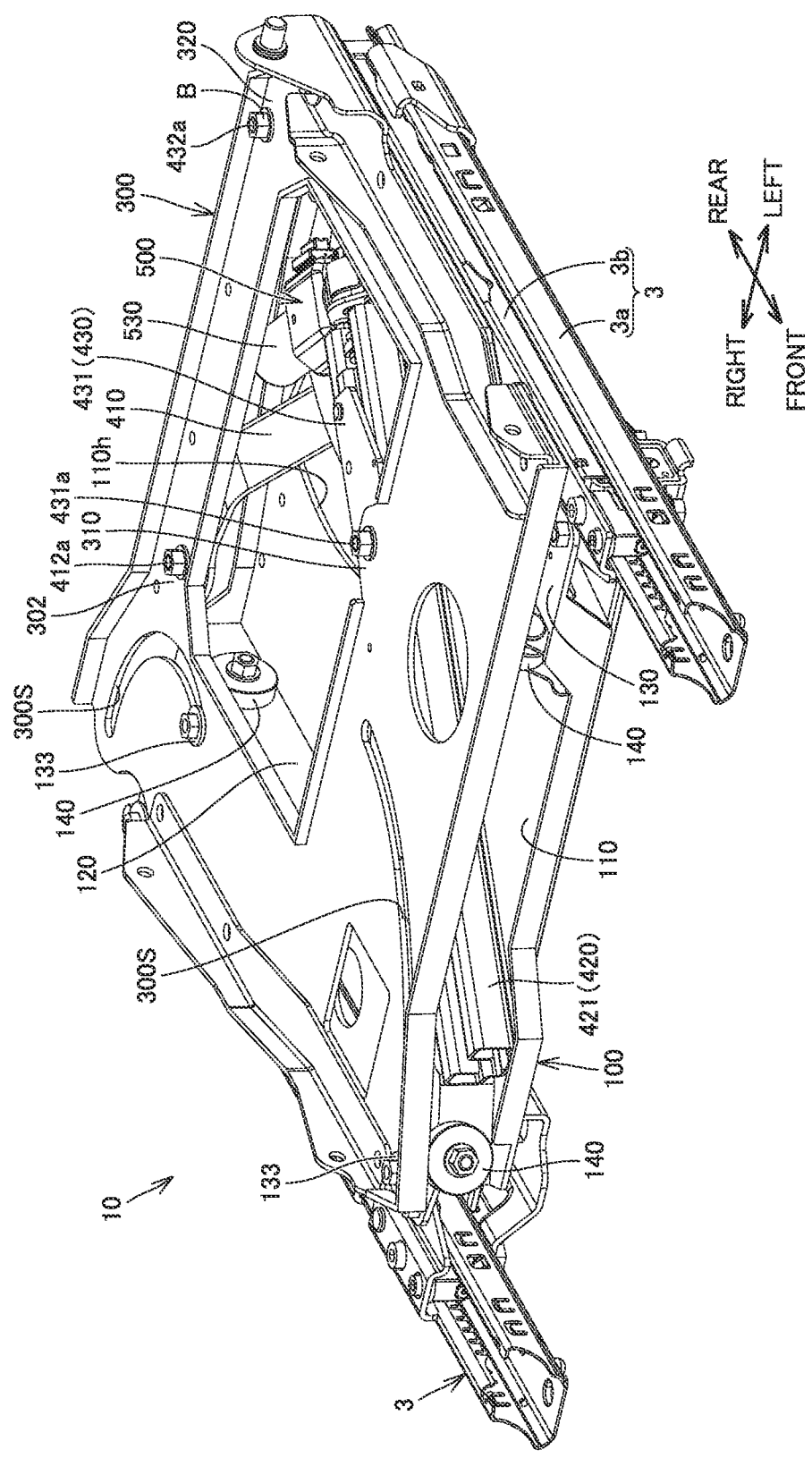
FIG. 3 is a perspective view illustrating a seat rotating device in the seating position.
Figure 4:
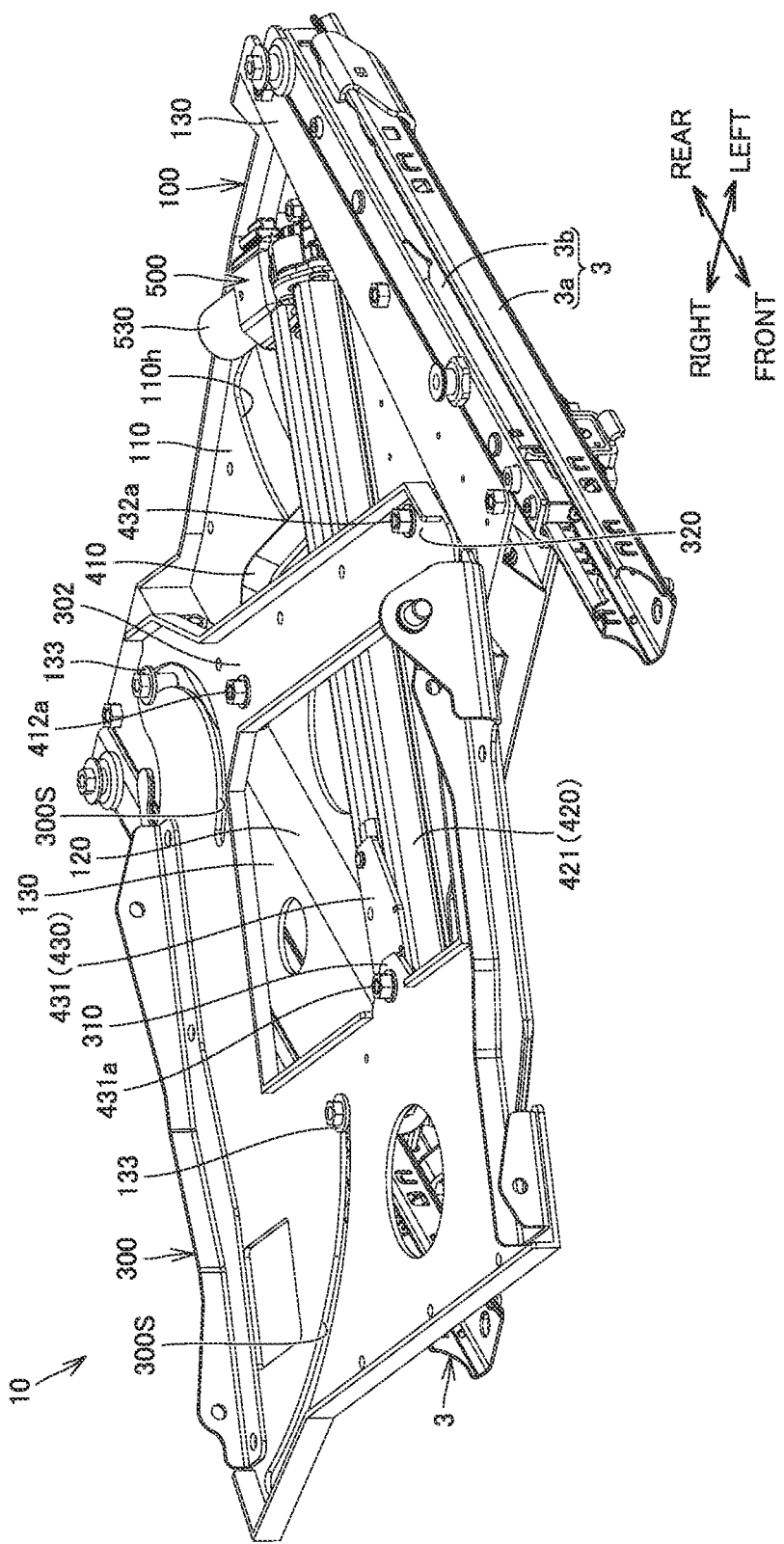
FIG. 4 is a perspective view illustrating the seat rotating device at the getting-on and -off position.
Figure 5:
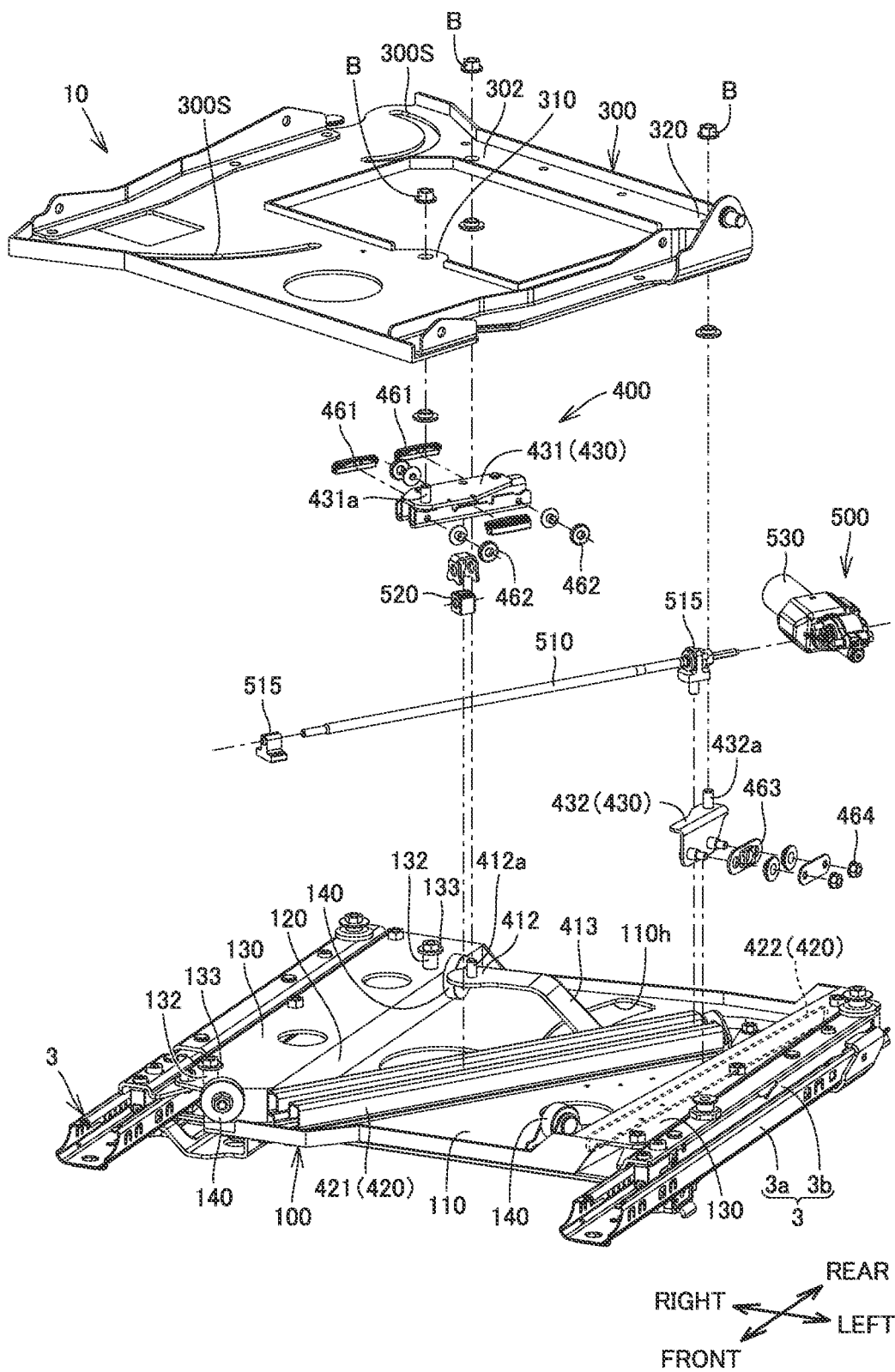
FIG. 5 is an exploded perspective view illustrating the seat rotating device

FIG. 3 is a perspective view illustrating a seat rotating device in the seating position. FIG. 4 is a perspective view illustrating the seat rotating device at the getting-on and -off position. FIG. 5 is an exploded perspective view illustrating the seat rotating device.

As illustrated in FIGS. 3 to 5, seat rotating device 10 includes a base plate 100, a rotating plate 300, a coupling unit 400, and a drive unit 500.

Base plate 100 is directly fixed to floor FL of the car or indirectly fixed to floor FL of the car through another member. Base plate 100 includes a base 110, an upright unit 120, and an upper rail connecting unit 130.

Base 110 is formed in a substantially flat plate shape. In the first embodiment, base 110 is formed in a rectangular shape elongated in the front-rear direction.

Upright unit 120 stands upright from both ends of base 110 in a width direction.

Upper rail connecting unit 130 has a shape projecting outward in the width direction of the car from an upper end of upright unit 120. Upper rail connecting unit 130 is connected to upper rail 3b of seat slider 3. Thus, base plate 100 is movable in the front-rear direction of the vehicle with respect to lower rail 3a together with upper rail 3b.

A guide protrusion 132 that guides the movement of rotating plate 300 with respect to base plate 100 is connected to upper rail connecting unit 130. Guide protrusion 132 has a shape rising from upper rail connecting unit 130. In the first embodiment, guide protrusion 132 is formed in a columnar shape. A flange 133 projecting outward in a radial direction of guide protrusion 132 is provided on an upper portion of guide protrusion 132.

In the first embodiment, a roller 140 that stabilizes the relative movement of rotating plate 300 with respect to base plate 100 is attached to base plate 100.

Rotating plate 300 is fixed to the lower surface of seat body 2 so as not to rotate relative to seat body 2. As illustrated in FIGS. 3 to 5, a slit 300S through which guide protrusion 132 is inserted is provided in rotating plate 300. Slit 300S is formed in a shape that does not interfere with guide protrusion 132 and prohibits insertion of flange 133 when rotating plate 300 moves between the seating position and the getting-on and -off position. Thus, separation of rotating plate 300 from base plate 100 is prevented when upward force acts on rotating plate 300 through seat body 2 at the time of front collision of the vehicle or the like.

Coupling unit 400 couples base plate 100 and rotating plate 300 such that rotating plate 300 is rotatable with respect to base plate 100 between the seating position and the getting-on and -off position.

Coupling unit 400 includes a link 410, a guide 420, and a moving body 430.

Link 410 connects base plate 100 and rotating plate 300. More specifically, link 410 connects base 110 and rotating plate 300. Link 410 has a fixing end 411, a rotating end 412, and an intermediate unit 413.

Figure 9:
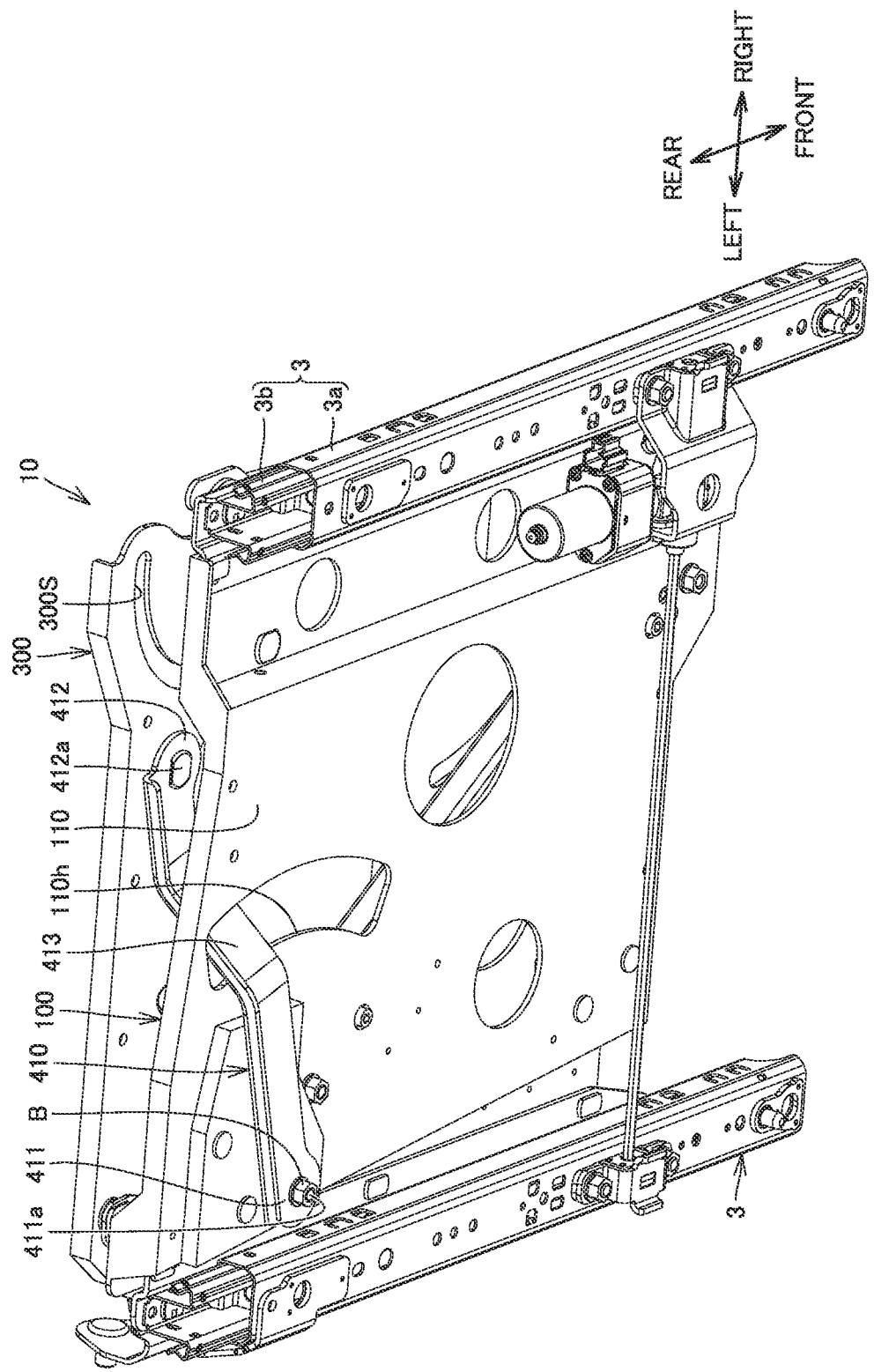
FIG. 9 is a perspective view illustrating the seat rotating device at the seating position when viewed from a back surface side of the base plate.

Fixing end 411 is fixed to base plate 100 so as to be relatively rotatable with respect to base plate 100. As illustrated in FIGS. 7 and 9, fixing end 411 has a fixed unit 411a fixed to base 110 by a fastening member B. Fixing end 411 is fixed to a motor receiving unit 114 (see FIGS. 6 and 7) of base 110 described later from the back side of base 110 by fastening member B. Fixing end 411 is configured by one end of link 410.

Rotating end 412 is rotatable with respect to base plate 100 about fixing end 411 as a rotation center, and is fixed to rotating plate 300 so as to be relatively rotatable with respect to rotating plate 300. As illustrated in FIG. 5 and the like, rotating end 412 includes a support 412a that rotatably supports rotating plate 300. Support 412a is fixed to rotating plate 300 by fastening member B. Hereinafter, a member of rotating plate 300 supported by support 412a is referred to as a "supported unit 302" (see FIGS. 4 and 5). Rotating end 412 is located on the front side of base 110. Rotating end 412 is configured by the other end of link 410.

Intermediate unit 413 is a member located between fixing end 411 and rotating end 412. Intermediate unit 413 connects fixing end 411 and rotating end 412. Intermediate unit 413 has a shape extending from the back side of base 110 to the front side of base 110. An insertion hole 110h through which intermediate unit 413 is inserted is made in base 110. Insertion hole 110h is made in an arc shape.

Figure 10:
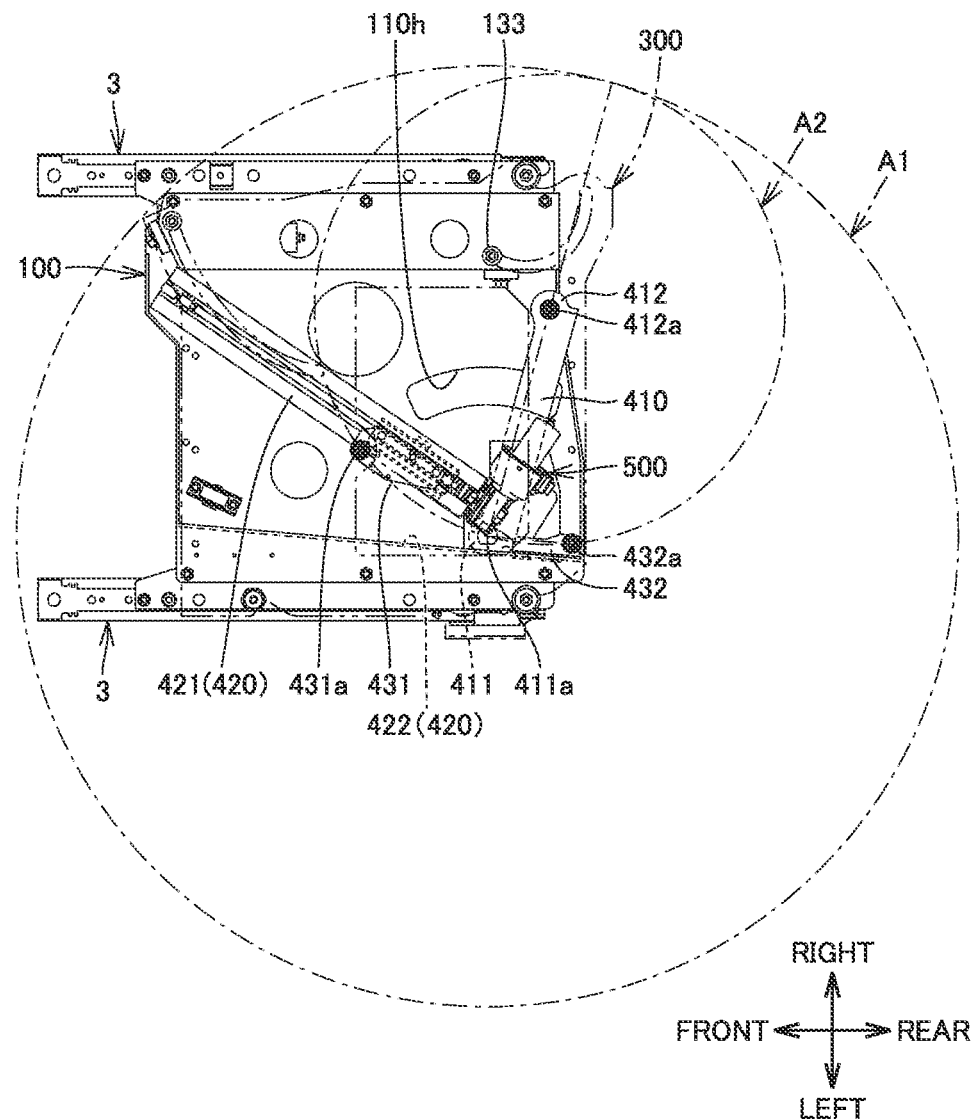
FIG. 10 is a view schematically illustrating a positional relationship among the base plate, a rotating plate, and the coupling unit in the seating position.
Figure 11:
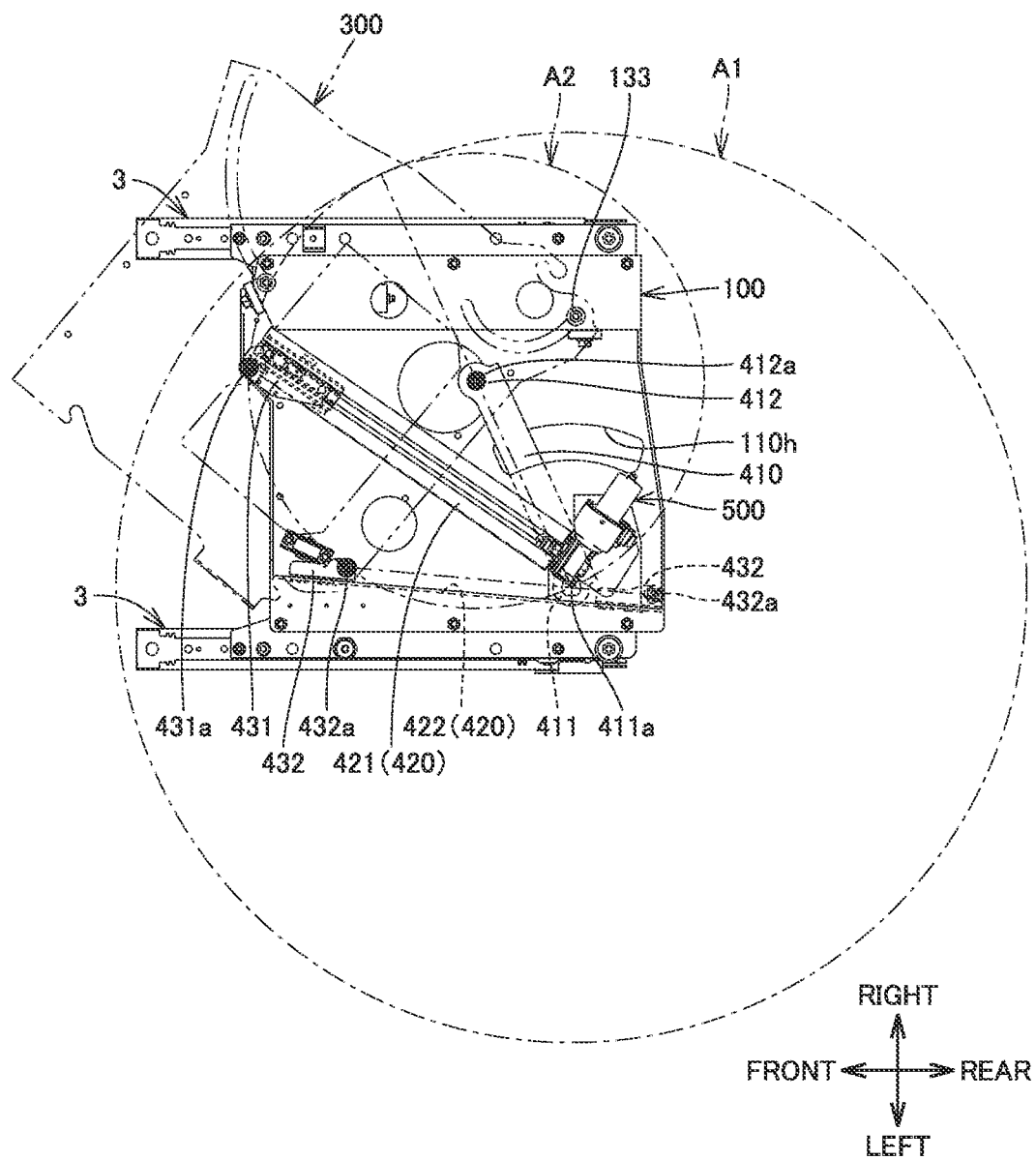
FIG. 11 is a view schematically illustrating the positional relationship among the base plate, the rotating plate, and the coupling unit at the getting-on and -off position.

Guide 420 is provided on base plate 100. Guide 420 has a linearly extending shape. Guide 420 has a shape extending linearly along a diameter of a virtual circle A1 (see FIGS. 10 and 11), the virtual circle A1 having a length twice the distance between fixing end 411 and rotating end 412 as its radius, and having fixing end 411 as its center. Virtual circle A1 is a circle, in which a radius is twice the distance between fixed unit 411a of fixing end 411 and support 412a of rotating end 412 and the center is fixed unit 411a. In FIGS. 10 and 11, a circle A2, in which the length between fixed unit 411a and support 412a is set to the radius and the center is support 412a, and virtual circle A1 are indicated by alternate long and short dash lines.

Figure 6:
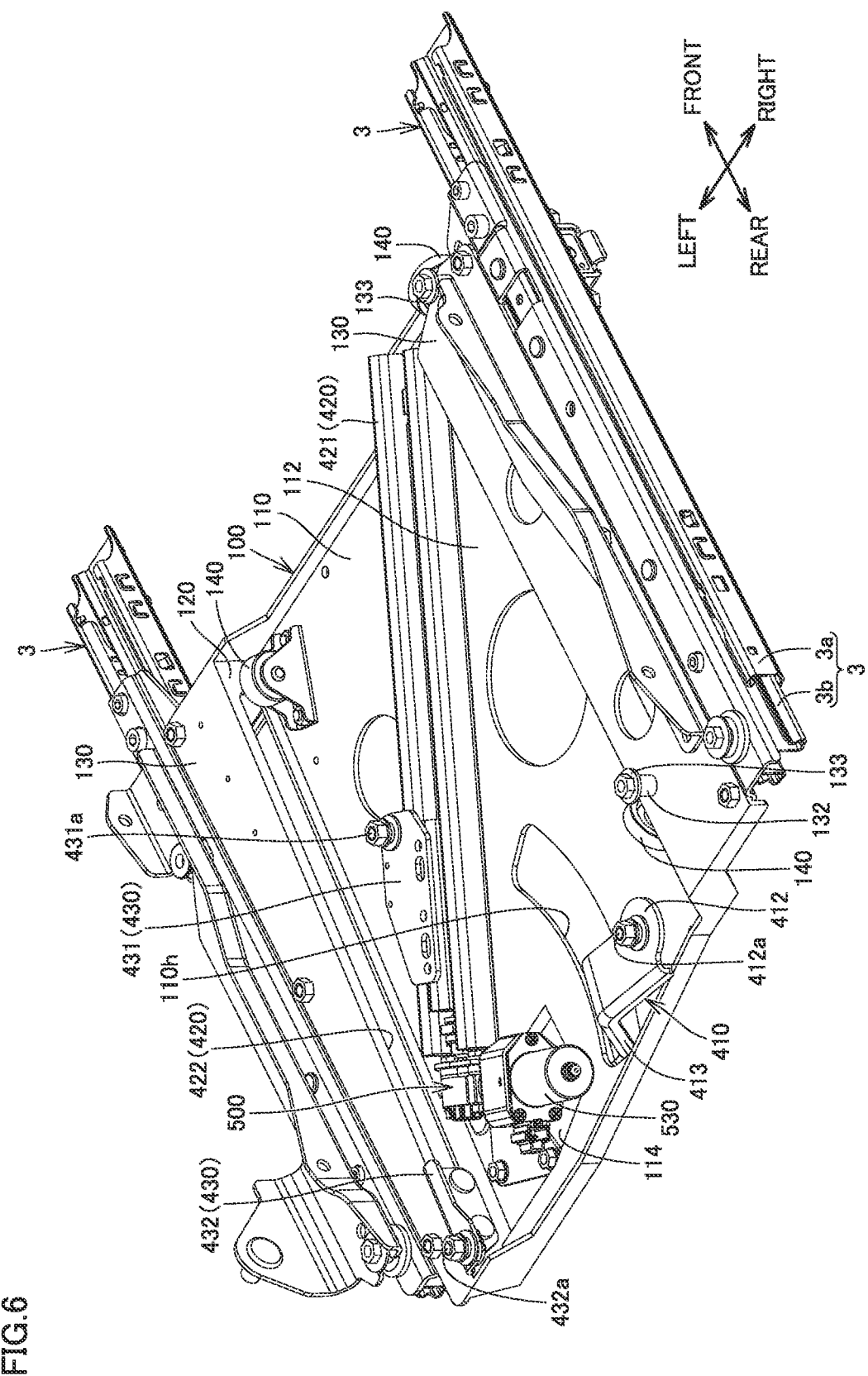
FIG. 6 is a view illustrating a positional relationship among a base plate, a coupling unit, and a drive unit at the seating position.
Figure 7:
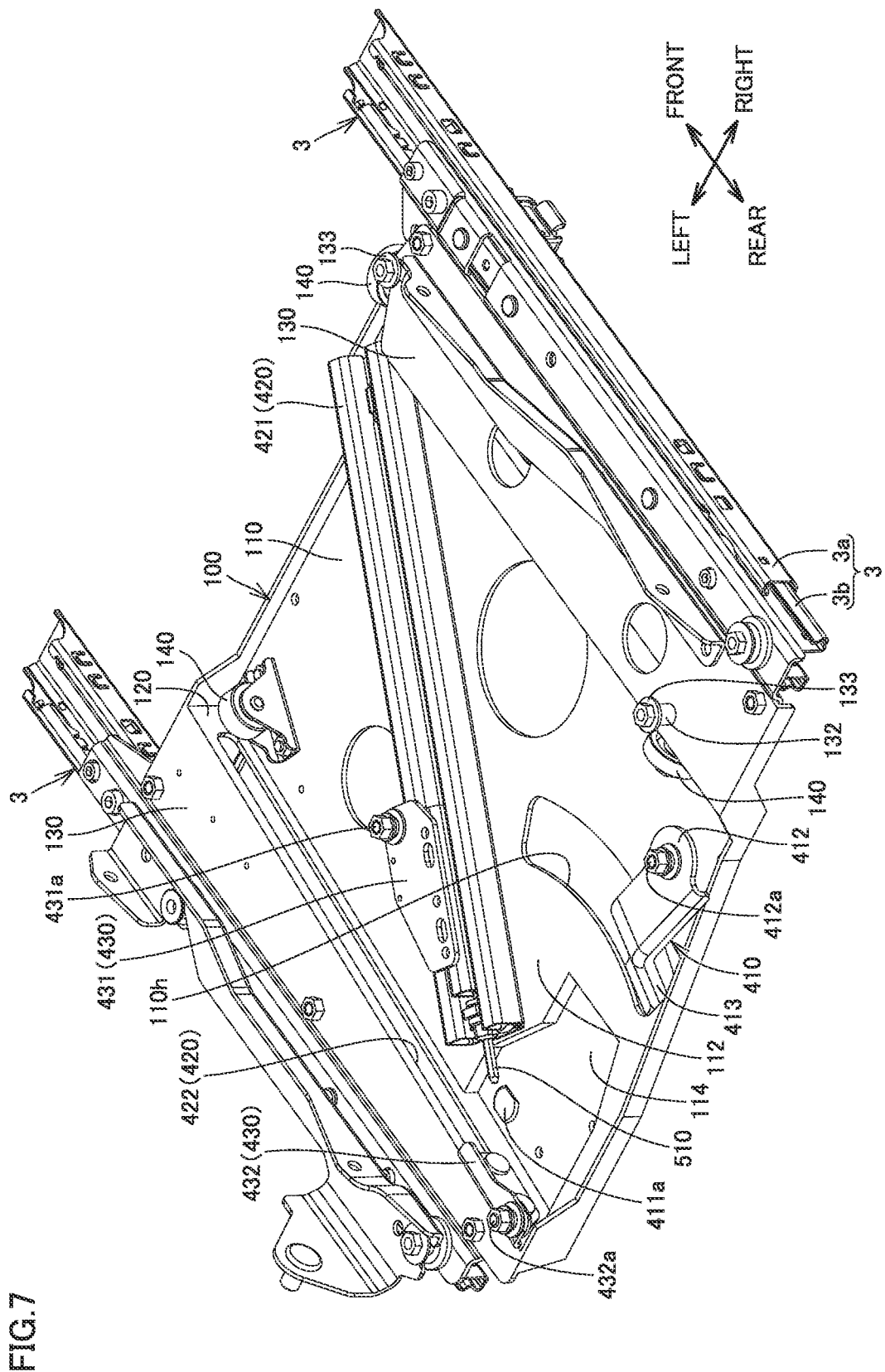
FIG. 7 is a perspective view illustrating a rail receiving unit and a motor receiving unit in a base unit.

As illustrated in FIGS. 5 to 7, guide 420 includes a lower rail 421 and a long groove 422.

Lower rail 421 is fixed to base plate 100. Specifically, lower rail 421 is fixed to base 110. As illustrated in FIGS. 10 and 11, lower rail 421 has a shape extending linearly in a direction intersecting the front-rear direction of the car and along the diameter of virtual circle A1. Lower rail 421 is inclined with respect to the front-rear direction so as to gradually approach the opening of the door toward the front of the car.

Long groove 422 is formed in base plate 100. As illustrated in FIGS. 5 to 7, long groove 422 is formed in upright unit 120. As illustrated in FIGS. 10 and 11, long groove 422 has a shape extending linearly in a direction intersecting lower rail 421 and along the diameter of virtual circle A1. In the first embodiment, as illustrated in FIGS. 10 and 11, long grooves 422 are slightly inclined with respect to the longitudinal direction (front-rear direction) of seat slider 3.

Moving body 430 is movable along guide 420. Moving body 430 supports rotating plate 300 such that rotating plate 300 is relatively rotatable with respect to moving body 430. Moving body 430 moves a part away from the supported unit 302 (see FIGS. 4 and 5) supported by rotating end 412 in rotating plate 300 along guide 420 while relatively rotating the part with respect to moving body 430 in the same direction as the direction (clockwise in FIG. 10) in which rotating plate 300 rotates with respect to rotating end 412 when rotating plate 300 moves from the seating position to the getting-on and -off position.

As illustrated in FIG. 5 and the like, moving body 430 includes an upper slider 431 and a groove slider 432.

Upper slider 431 is movable along lower rail 421. Upper slider 431 supports rotating plate 300 such that rotating plate 300 is relatively rotatable with respect to upper slider 431. As illustrated in FIG. 5 and the like, upper slider 431 includes a first support 431a that supports rotating plate 300. First support 431a supports a member (hereinafter, referred to as a "first supported unit 310") away from supported unit 302 in rotating plate 300. First support 431a is fixed to rotating plate 300 by fastening member B. Upper slider 431 moves first supported unit 310 forward along lower rail 421 while relatively rotating the first supported unit 310 with respect to the first support 431a in the same direction as the direction in which rotating plate 300 rotates with respect to rotating end 412 when rotating plate 300 moves from the seating position to the getting-on and -off position.

As illustrated in FIGS. 10 and 11, the movement locus of first support 431a, namely, the line segment connecting the position of first support 431a at the seating position and the position of first support 431a at the getting-on and -off position is located in front of fixed unit 411a that is the center of virtual circle A1.

As illustrated in FIGS. 3 to 5, first supported unit 310 corresponds to a central portion of rotating plate 300.

In the case where seat body 2 moves from the seating position to the getting-on and -off position, upper slider 431 moves along the locus (the diameter of virtual circle A1) of a point on circle A2 when circle A2 rotates while being inscribed in virtual circle A1. The point on circle A2 corresponds to first support 431a.

Figure 8:
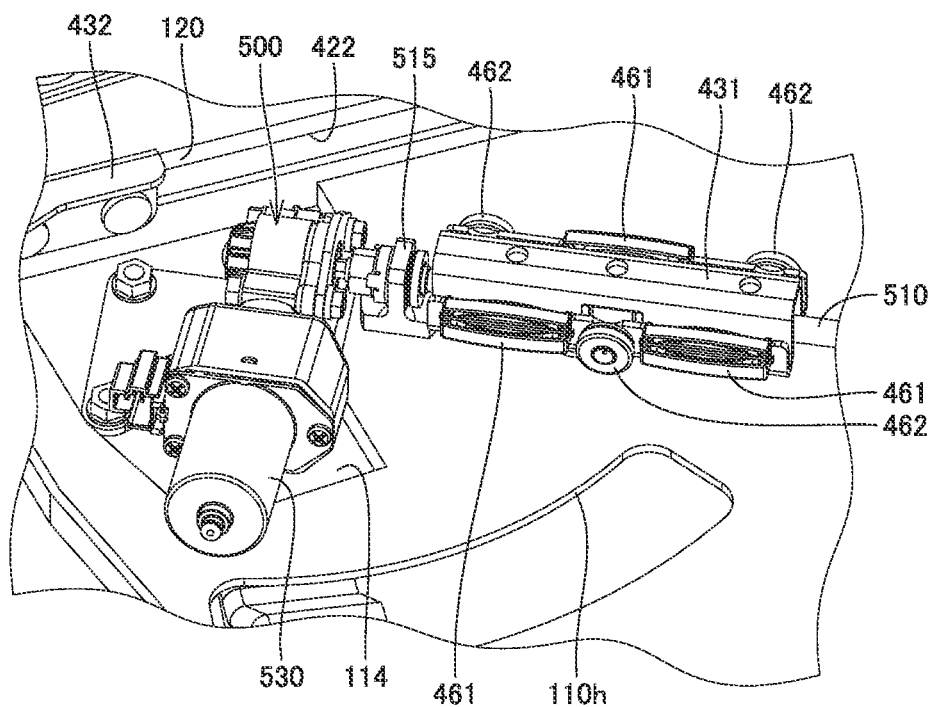
FIG. 8 is an enlarged perspective view illustrating a vicinity of an upper slider.

As illustrated in FIG. 8, on both sides of upper slider 431 in a direction orthogonal to both the longitudinal direction and the vertical direction of lower rail 421, a sliding members 461 made of resin or the like and a bearing 462 are disposed in zigzag. Thus, rattling of upper slider 431 is effectively prevented in both the lateral direction and the vertical direction of lower rail 421.

Groove slider 432 is movable along long groove 422. Groove slider 432 supports rotating plate 300 such that rotating plate 300 is relatively rotatable with respect to groove slider 432. As illustrated in FIG. 5 and the like, groove slider 432 includes a second support 432a that supports rotating plate 300. Second support 432a supports a member (hereinafter, referred to as a "second supported unit 320") away from both supported unit 302 and the first supported unit 310 in rotating plate 300. Second support 432a is fixed to rotating plate 300 by fastening member B. Groove slider 432 moves second supported unit 320 forward along long groove 422 while relatively rotating second supported unit 320 with respect to second support 432a in the same direction as the direction in which rotating plate 300 rotates with respect to rotating end 412 when rotating plate 300 moves from the seating position to the getting-on and -off position. Groove slider 432 is fixed to upright unit 120 by a plate 463 and a fastening member 464.

As illustrated in FIGS. 10 and 11, fixed unit 411a that is the center of virtual circle A1 is located on the movement locus of second support 432a. That is, the position of second support 432a at the seating position is located behind fixed unit 411a, and the position of second support 432a at the getting-on and -off position is located in front of fixed unit 411a.

As illustrated in FIGS. 3 to 5, second supported unit 320 corresponds to the rear side of rotating plate 300 and on the inner end in the width direction.

When seat body 2 moves from the seating position to the getting-on and -off position, groove slider 432 moves along the locus (the diameter of the virtual circle A1) of the point on circle A2 when circle A2 rotates while inscribing in virtual circle A1. The point on circle A2 corresponds to second support 432a.

As illustrated in FIGS. 10 and 11, the extending line of the movement locus of first support 431a moving along lower rail 421 and the movement locus of second support 432a moving along long groove 422 intersect at fixed unit 411a. In addition, support 412a, first support 431a, and second support 432a are preferably set at positions substantially forming an equilateral triangle.

Drive unit 500 drives coupling unit 400. Drive unit 500 can move moving body 430 along guide 420. As illustrated in FIG. 5, drive unit 500 includes a feed screw 510, a nut member 520, and a motor 530.

Feed screw 510 is disposed in lower rail 421. Feed screw 510 is rotatable relative to lower rail 421. Specifically, feed screw 510 is held by a holding member 515 (see FIG. 5) that holds feed screw 510 in a relatively rotatable manner, and holding member 515 is fixed to base 110.

Nut member 520 is movable in the longitudinal direction of feed screw 510 while relatively rotating with respect to feed screw 510. Nut member 520 is fixed to upper slider 431. Thus, upper slider 431 moves in the longitudinal direction (the longitudinal direction of lower rail 421) of feed screw 510 together with nut member 520.

Motor 530 can rotate feed screw 510. An output shaft of motor 530 is connected to feed screw 510 through a gear (a helical gear or the like). As illustrated in FIG. 3, motor 530 is disposed between base plate 100 and rotating plate 300. As illustrated in FIGS. 4 and 6, motor 530 is disposed on the side of lower rail 421 in the longitudinal direction of lower rail 421.

As illustrated in FIGS. 6 and 7, base 110 includes a rail receiving unit 112 that receives lower rail 421 and a motor receiving unit 114 that receives motor 530, and motor 530 is disposed in motor receiving unit 114. Rail receiving unit 112 is formed in a flat plate shape. Motor receiving unit 114 is formed at a position lower than rail receiving unit 112.

Reference to FIGS. 10 and 11, the operation of seat rotating device 10 will be described with below. FIG. 10 is a view schematically illustrating a positional relationship among the base plate, a rotating plate, and the coupling unit in the seating position. FIG. 11 is a view schematically illustrating the positional relationship among the base plate, the rotating plate, and the coupling unit at the getting-on and -off position. An entrance of the car is provided above in FIGS. 10 and 11. In FIGS. 10 and 11, rotating plate 300 is indicated by an alternate long and two short dashes line.

At the seating position in FIG. 10, link 410 comes close to or in contact with the rear end of insertion hole 110h, upper slider 431 is located at the rear end of lower rail 421, and groove slider 432 is located at the rear end of long groove 422. First supported unit 310 and second supported unit 320 of rotating plate 300 are located on circle A2.

At the getting-on and -off position in FIG. 11, link 410 comes close to or in contact with the front end of insertion hole 110h, upper slider 431 is located at the front end of lower rail 421, and groove slider 432 is located at the front end of long groove 422.

The case where rotating plate 300 is moved from the seating position to the getting-on and -off position will be described below. In this case, motor 530 rotates feed screw 510 in the direction in which nut member 520 moves forward with respect to lower rail 421.

Then, as illustrated in FIGS. 10 and 11, according to upper slider 431 that moves forward along lower rail 421, support 412a of rotating end 412 rotates about the fixed unit 411a of fixed end 411, and groove slider 432 moves forward along long groove 422. Thus, rotating plate 300 rotates toward the entrance while moving forward.

Specifically, supported unit 302 supported by rotating end 412 in rotating plate 300 moves forward along the arc-shaped movement locus of the rotating end 412 with fixing end 411 as the rotation center while rotating toward the entrance with respect to support 412a of rotating end 412. First supported unit 310 moves forward together with upper slider 431 along lower rail 421 while rotating with respect to first support 431a in the same direction as the direction (clockwise in FIGS. 10 and 11) in which rotating plate 300 rotates with respect to rotating end 412. Second supported unit 320 moves forward together with groove slider 432 along long groove 422 while rotating with respect to second support 432a in the same direction as the direction (clockwise in FIGS. 10 and 11) in which rotating plate 300 rotates with respect to rotating end 412. As a result, rotating plate 300 moves to the getting-on and -off position.

In seat rotating device 10 described above, because guide 420 has the shape extending linearly along the diameter of virtual circle A1, moving body 430 moves along the locus (the diameter of virtual circle A1) of the point on the circle A2 when circle A2 rotates while being inscribed in virtual circle A1 in the case where rotating plate 300 (seat body 2) moves from the seating position to the getting-on and -off position. That is, link 410 moves along an arc having fixing end 411 as the rotation center, and moving body 430 moves linearly along the diameter of virtual circle A1. Thus, the calculation of the precise locus can be omitted, and the seat body 2 can be rotated with the relatively simple structure.

Furthermore, a post 4 (see FIG. 1) provided in the car can be prevented because seat rotating device 10 rotates seat body 2 toward the entrance while moving seat body 2 forward.

In addition, because the movement locus of upper slider 431 is located in front of fixed unit 411a that is the center of virtual circle A1, both the movement of rotating plate 300 from the seating position to the getting-on and -off position and the movement of rotating plate 300 from the getting-on and -off position to the seating position are achieved by the rotation of link 410 in one direction. Thus, the operation efficiency is increased.

Furthermore, because feed screw 510 and nut member 520 are provided on the side of lower rail 421, the moving distance of the moving body (upper slider 431) is reduced as compared with the case where feed screw 510 and nut member 520 are provided on the side of long groove 422.

In addition, because only axial force acts on feed screw 510 and nut member 520 during the movement of rotating plate 300, feed screw 510 and nut member 520 can withstand a relatively large load.

Furthermore, in the first embodiment, seat body 2 is stably supported because rotating plate 300 is supported at three points of rotating end 412, upper slider 431, and groove slider 432. One of upper slider 431 and groove slider 432 may be omitted. Lower rail 421 is also omitted when upper slider 431 is omitted, and long groove 422 is also omitted when groove slider 432 is omitted. When upper slider 431 and lower rail 421 are omitted, drive unit 500 is configured to drive groove slider 432.

Second Embodiment

Figure 12:
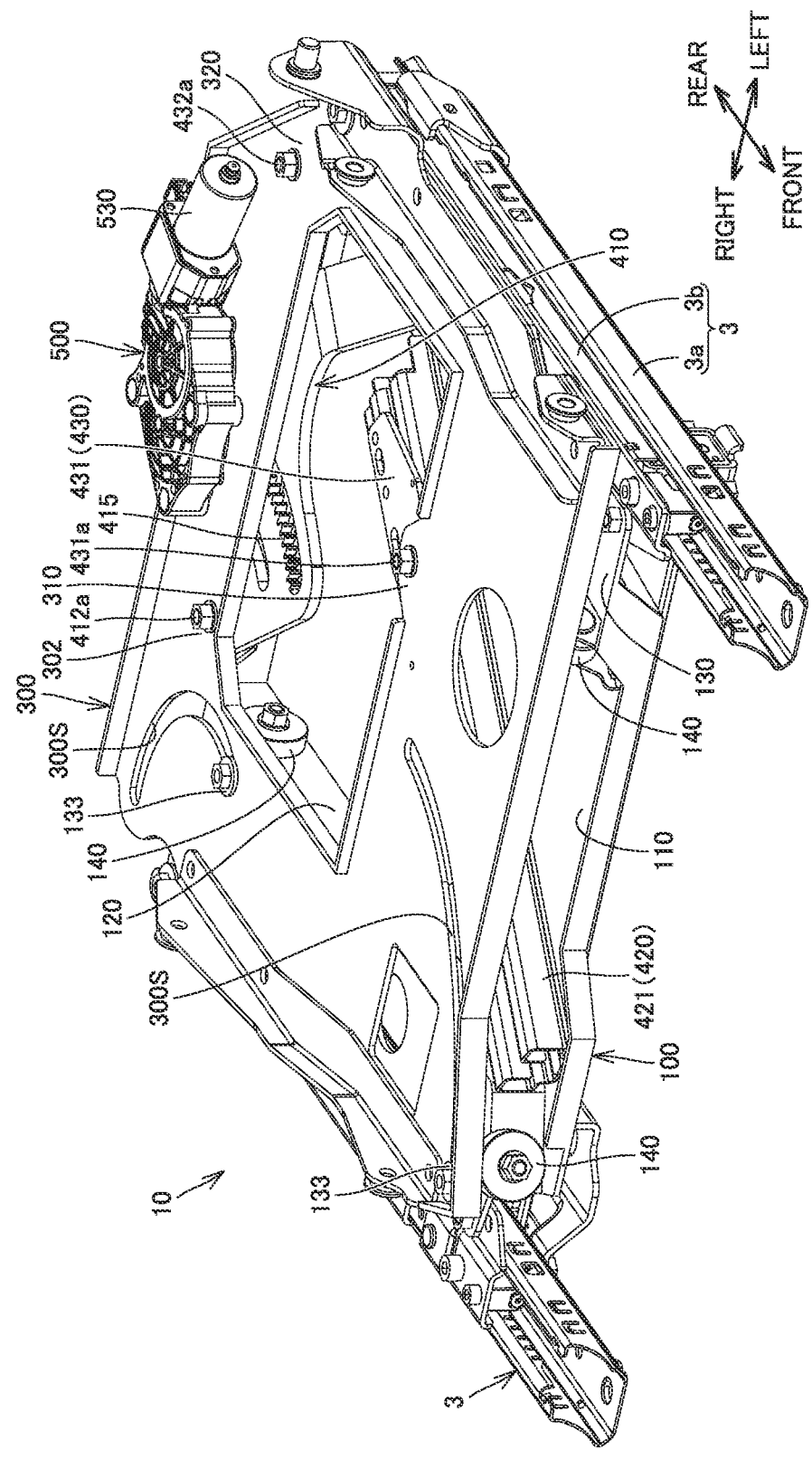
FIG. 12 is a perspective view illustrating a seat rotating device at a seating position according to a second embodiment of the present invention.
Figure 13:
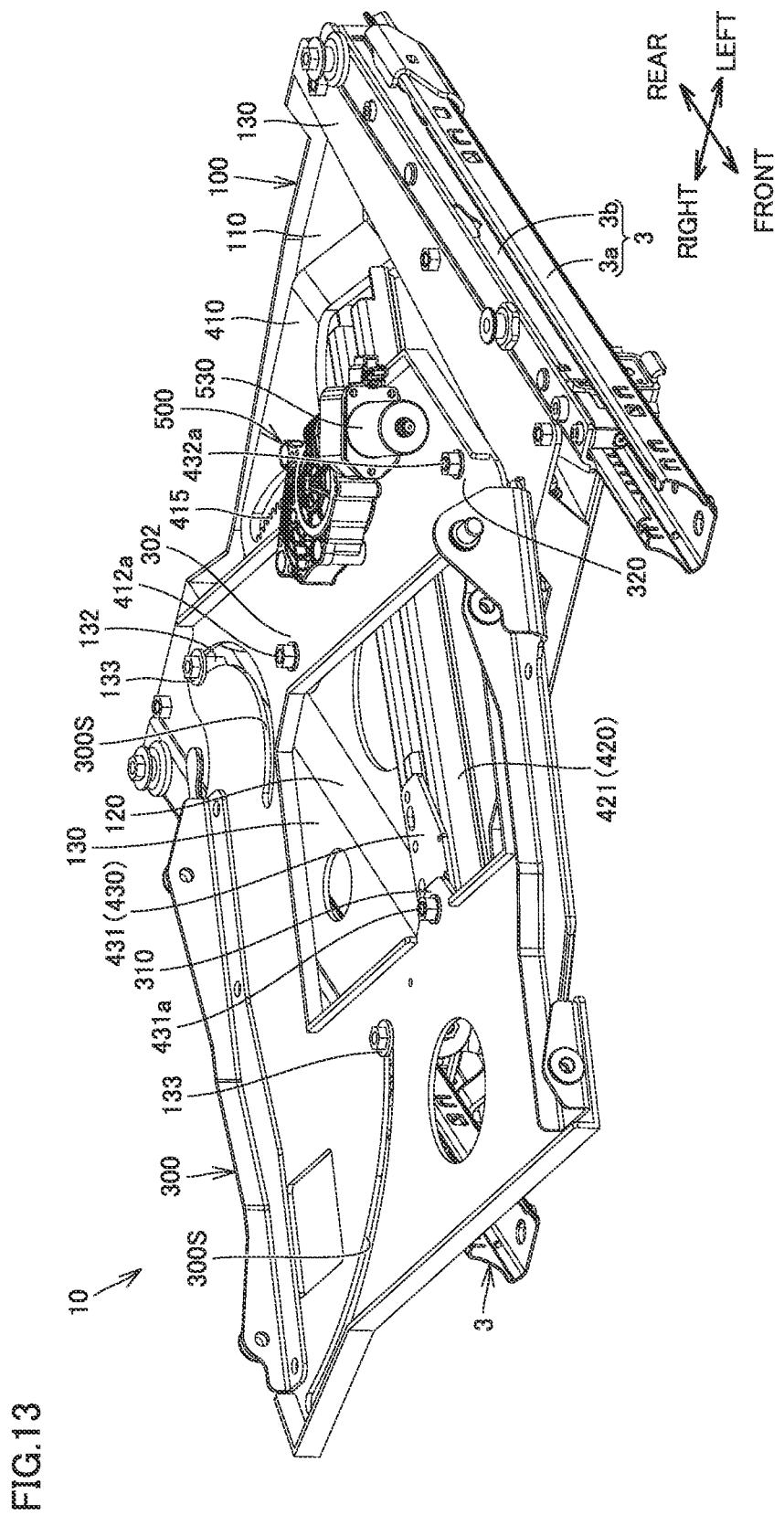
FIG. 13 is a perspective view illustrating the seat rotating device at a getting-on and -off position.
Figure 14:
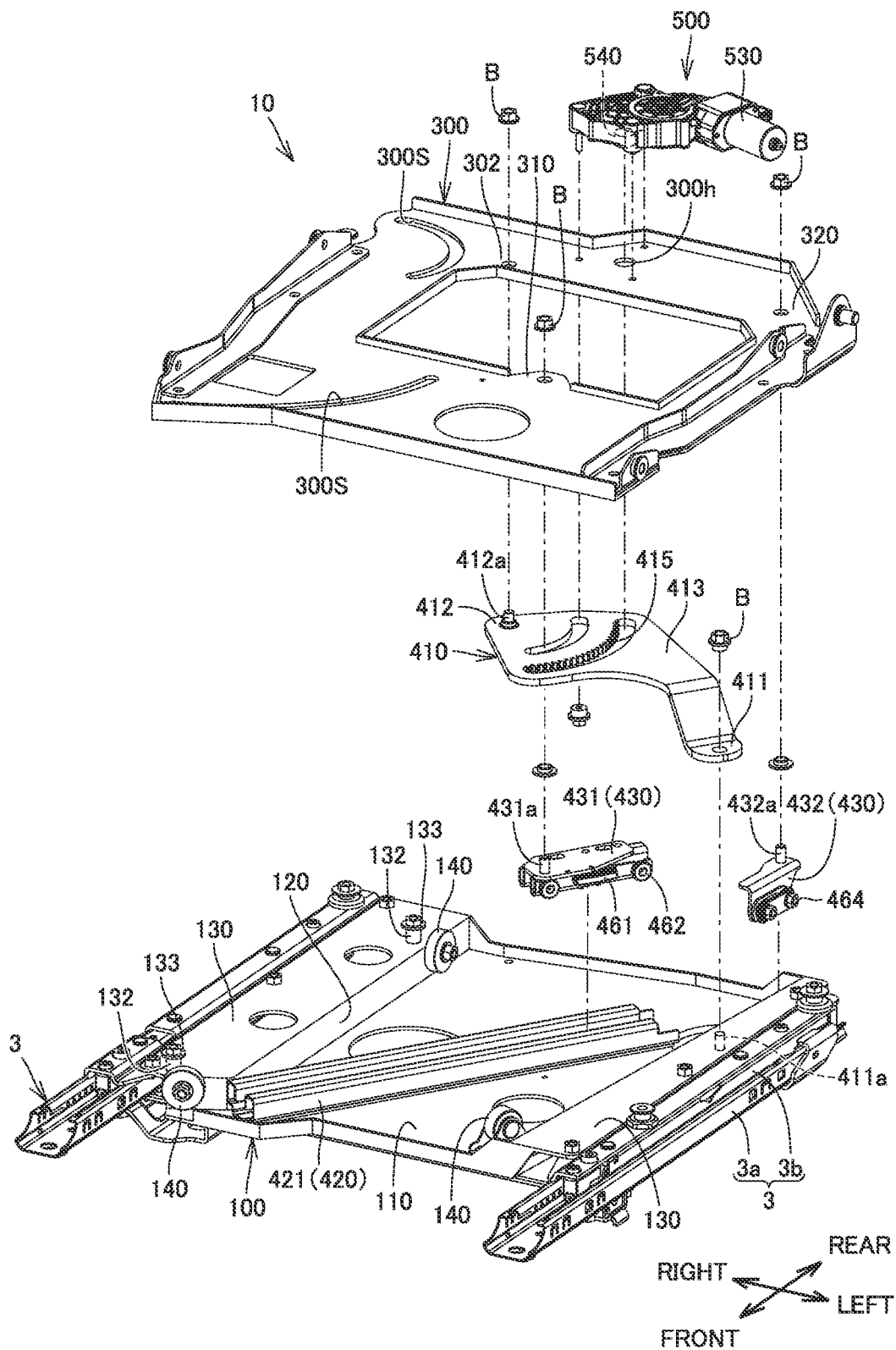
FIG. 14 is an exploded perspective view illustrating the seat rotating device of the second embodiment.

With reference to FIGS. 12 to 14, a rotary seat 1 according to a second embodiment of the present invention will be described below. FIG. 12 is a perspective view illustrating a seat rotating device at a seating position according to a second embodiment of the present invention. FIG. 13 is a perspective view illustrating the seat rotating device at a getting-on and -off position. FIG. 14 is an exploded perspective view illustrating the seat rotating device of the second embodiment. In the second embodiment, only portions different from those of the first embodiment will be described, and the description of the same structure, operation, and effect as those of the first embodiment will not be repeated.

In the second embodiment, the drive unit 500 further includes a pinion 540 (see FIG. 14) fixed to the output shaft of motor 530, and link 410 further includes a gear 415 meshing with pinion 540.

Drive unit 500 is fixed on rotating plate 300. That is, in the second embodiment, drive unit 500 moves relative to base plate 100 together with rotating plate 300. Pinion 540 is inserted through a through-hole 300h (see FIG. 14) made in rotating plate 300.

Gear 415 is provided in intermediate unit 413 of link 410. Gear 415 rotates rotating end 412 relative to base plate 100 around fixing end 411 in association with the rotation of pinion 540. Gear 415 is formed in an arc shape protruding in the direction away from second support 432a.

In the second embodiment, as illustrated in FIG. 14, fixed unit 411a protrudes upward from the upper surface of base plate 100, and fixing end 411 is fixed to the upper surface of base plate 100.

In the second embodiment, pinion 540 rotates when motor 530 rotates. Because gear 415 meshes with pinion 540, link 410 rotates relative to base plate 100 around fixing end 411.

Along with the rotation of link 410, upper slider 431 moves along lower rail 421 and groove slider 432 moves along long groove 422. Accordingly, rotating plate 300 and seat body 2 move between the seating position and the getting-on and -off position.

It is understood by those skilled in the art that the embodiments described above are specific examples of the following aspects.

A seat rotating device according to the embodiment seat is a rotating device capable of rotating a seat body between a seating position where the seat body faces a front of a car and a getting-on and -off position where the seat body faces an opening of a door of the car. The seat rotating device includes: a base plate fixed to a floor side; a rotating plate fixed to a lower surface of the seat body so as not to rotate relative to the seat body; a coupling unit that couples the base plate and the rotating plate such that the rotating plate is rotatable with respect to the base plate between the seating position and the getting-on and -off position; and a drive unit that drives the coupling unit, wherein the coupling unit includes: a link that couples the base plate and the rotating plate; a guide that is provided on the base plate and has a linearly extending shape, and a moving body that is movable along the guide and supports the rotating plate such that the rotating plate is relatively rotatable with respect to the moving body, the drive unit is able to move the moving body along the guide, the link includes: a fixing end fixed to the base plate so as to be relatively rotatable with respect to the base plate; and a rotating end that is rotatable with respect to the base plate about the fixing end as a rotation center and is fixed to the rotating plate so as to be relatively rotatable with respect to the rotating plate, the guide has a shape extending linearly along a diameter of a virtual circle, the virtual circle having a length twice a distance between the fixing end and the rotating end as its radius, and having the fixing end as its center, and the moving body moves a part of the rotating plate along the guide, while relatively rotating the part with respect to the moving body in an identical direction to a direction in which the rotating plate rotates with respect to the rotating end when the rotating plate moves from the seating position to the getting-on and -off position, the part being spaced apart from a part of the rotating plate that is fixed to the rotating end.

In seat rotating device, because the guide has the shape extending linearly along the diameter of the virtual circle, the moving body moves along the locus (the diameter of the virtual circle) of the point on the circle when the circle that has a radius twice a distance between the fixing end and the rotating end and has a the rotating end as a center rotates while being inscribed in the virtual circle in the case where the rotating plate (seat body) moves from the seating position to the getting-on and -off position. That is, the link moves along an arc having the fixing end as a rotation center, and the moving body moves linearly along the diameter of the virtual circle, so that calculation of a precise locus can be omitted and the seat body can be rotated with a relatively simple structure.

Preferably the guide includes a lower rail that is fixed to the base plate and has a shape extending linearly in a direction intersecting a front-rear direction of the car and along a diameter of the virtual circle, the moving body includes an upper slider movable along the lower rail, and the upper slider supports the rotating plate such that the rotating plate is relatively rotatable with respect to the upper slider.

Preferably the drive unit includes: a feed screw that is disposed in the lower rail and is rotatable relative to the lower rail; a nut member that is movable in a longitudinal direction of the feed screw while relatively rotating with respect to the feed screw and is fixed to the upper slider; and a motor capable of rotating the feed screw.

In this aspect, because the feed screw is disposed in the lower rail, a disposition space of the mechanism moving the upper slider is reduced.

Preferably the motor is disposed between the base plate and the rotating plate and on a side of the lower rail in the longitudinal direction of the lower rail.

Preferably the base plate includes: a rail receiving unit that receives the lower rail; and a motor receiving unit that receives the motor, and the motor receiving unit is formed at a position lower than the rail receiving unit.

In this way, a thickness of the seat rotating device is further reduced.

Preferably the drive unit includes: a pinion; and a motor capable of rotating the pinion, the link further includes a gear that meshes with the pinion, and the gear rotates the rotating end relative to the base plate around the fixing end in association with the rotation of the pinion.

Preferably the guide further includes a long groove that is formed in the base plate and has a shape linearly extending in a direction intersecting the lower rail and along a diameter of the virtual circle, and the moving body further includes a groove slider movable along the long groove.

In this aspect, the posture of the rotating plate is stabilized because the rotating plate is supported at three points of the rotating end, the upper slider, and the groove slider.

In this case, the long groove is preferably inclined with respect to the front-rear direction of the car.

In this way, as compared with the case where the long groove is formed in parallel to the front-rear direction, the position of the groove slider at the seating position is on the front side, so that the length of the rotating plate in the front-rear direction is shortened.

It should be considered that the disclosed embodiment is illustrative and non-restrictive in every respect. The scope of the present invention is defined by not the description of the embodiments, but the claims, and all changes within the meaning and scope equivalent to the claims are included in the present invention.

What is claimed is:

1. A seat rotating device capable of rotating a seat body between a seating position where the seat body faces a front of a car and a getting-on and -off position where the seat body faces an opening of a door of the car, the seat rotating device comprising:
    a base plate fixed to a floor side;
    a rotating plate fixed to a lower surface of the seat body so as not to rotate relative to the seat body;
    a coupling unit that couples the base plate and the rotating plate such that the rotating plate is rotatable with respect to the base plate between the seating position and the getting-on and -off position; and
    a drive unit that drives the coupling unit,
    wherein the coupling unit includes:
    a link that couples the base plate and the rotating plate;
    a guide that is provided on the base plate and has a linearly extending shape; and
    a moving body that is movable along the guide and supports the rotating plate such that the rotating plate is relatively rotatable with respect to the moving body,
    the drive unit is able to move the moving body along the guide, the link includes:

a fixing end fixed to the base plate so as to be relatively rotatable with respect to the base plate; and a rotating end that is rotatable with respect to the base plate about the fixing end as a rotation center and is fixed to the rotating plate so as to be relatively rotatable with respect to the rotating plate, the guide has a shape extending linearly along a diameter of a virtual circle, the virtual circle having a length twice a distance between the fixing end and the rotating end as its radius, and having the fixing end as its center, and the moving body moves a part of the rotating plate along the guide, while relatively rotating the part with respect to the moving body in an identical direction to a direction in which the rotating plate rotates with respect to the rotating end when the rotating plate moves from the seating position to the getting-on and -off position, the part being spaced apart from a part of the rotating plate that is fixed to the rotating end.

2. The seat rotating device according to claim 1, wherein the guide includes a lower rail that is fixed to the base plate and has a shape extending linearly in a direction intersecting a front-rear direction of the car and along a diameter of the virtual circle, the moving body includes an upper slider movable along the lower rail, and the upper slider supports the rotating plate such that the rotating plate is relatively rotatable with respect to the upper slider.

3. The seat rotating device according to claim 2, wherein the drive unit includes:

a feed screw that is disposed in the lower rail and is rotatable relative to the lower rail, a nut member that is movable in a longitudinal direction of the feed screw while relatively rotating with respect to the feed screw and is fixed to the upper slider; and a motor capable of rotating the feed screw.

4. The seat rotating device according to claim 3, wherein the motor is disposed between the base plate and the rotating plate and on a side of the lower rail in the longitudinal direction of the lower rail.

5. The seat rotating device according to claim 3, wherein the base plate includes:

a rail receiving unit that receives the lower rail; and a motor receiving unit that receives the motor, and the motor receiving unit is formed at a position lower than the rail receiving unit.

6. The seat rotating device according to claim 2, wherein the drive unit includes:

a pinion; and a motor capable of rotating the pinion, the link further includes a gear that meshes with the pinion, and the gear rotates the rotating end relative to the base plate around the fixing end in association with the rotation of the pinion.

7. The seat rotating device according to claim 2, wherein the guide further includes a long groove that is formed in the base plate and has a shape linearly extending in a direction intersecting the lower rail and along a diameter of the virtual circle, and the moving body further includes a groove slider movable along the long groove.

8. The seat rotating device according to claim 7, wherein the long groove is inclined with respect to the front-rear direction of the car.

* * * * *